Sept. 23, 1947.  R. M. RYDER  2,427,693
COUPLING SYSTEM
Filed April 17, 1942  3 Sheets-Sheet 1

INVENTOR
R. M. RYDER
BY
Harry C. Hart
ATTORNEY

Sept. 23, 1947.                R. M. RYDER                    2,427,693
                              COUPLING SYSTEM
                   Filed April 17, 1942        3 Sheets-Sheet 2

INVENTOR
R. M. RYDER
BY
Harry C. Hart
ATTORNEY

Sept. 23, 1947.　　　R. M. RYDER　　　2,427,693
COUPLING SYSTEM
Filed April 17, 1942　　　3 Sheets-Sheet 3

INVENTOR
R. M. RYDER
BY
Harry C. Hart
ATTORNEY

Patented Sept. 23, 1947

2,427,693

UNITED STATES PATENT OFFICE 2,427,693

COUPLING SYSTEM

Robert M. Ryder, New York, N. Y., assignor to Bell Telephone Laboratories, Incorporated, New York, N. Y., a corporation of New York Application April 17, 1942, Serial No. 439,366

10 Claims. (Cl. 179—171)

This invention relates to coupling systems and particularly to a system for coupling one cavity resonator to another.

An object of the invention is to provide improved means for effecting an intercoupling between two cavity resonators.

A related object is to provide simple and effective means for rendering readily adjustable the coupling between cavity resonators, both as to magnitude and phase.

A subsidiary object is to provide improved means for feeding back a desired portion of the output energy of an ultra-high frequency translating device, for example, a cavity resonator tuned amplifier to its input to produce regeneration, degeneration, or neutralization, as may be desired.

Operation of negative grid amplifier devices at ultra-high frequencies requires that the total positive feedback from output circuit to input circuit be below a certain minimum value. This frequently requires neutralization of unwanted feedback by controlled feedback. For example, in a cavity tuned triode having a negative grid mounted in a wall which is common to the input and output cavities, unwanted feedback from the output cavity to the input cavity may occur by way of the grid apertures or otherwise.

The invention provides a convenient and readily adjustable arrangement which provides such neutralization means. In a preferred embodiment, a coaxial line is loop coupled to each cavity, the two coupling loops being part of a single conductor which passes through an aperture in the common cavity wall and out through the cavity side walls to become the inner conductor of both coaxial lines. Movement of the inner conductor varies the sizes of the loops and, therefore, the line-to-cavity coupling. Movement of adjustable short-circuiting discs varies the coupling ratio. Furthermore, each of these movements varies the tuning of these lines.

The system is also useful to provide desired feedback, positive or negative, for purposes other than neutralization.

It is a significant feature of the invention that while the electromagnetic energy of oscillation of a cavity resonator is confined within the cavity, the magnitude and phase of the energy coupled from one cavity to another by way of the novel system may readily and conveniently be adjusted from the outside.

The invention will be fully understood from the appended drawings, taken in conjunction with the following description of a preferred embodiment in which, by way of illustration, the invention is applied to a feedback or neutralization system for an ultra-high frequency amplifying device.

Figure 1:
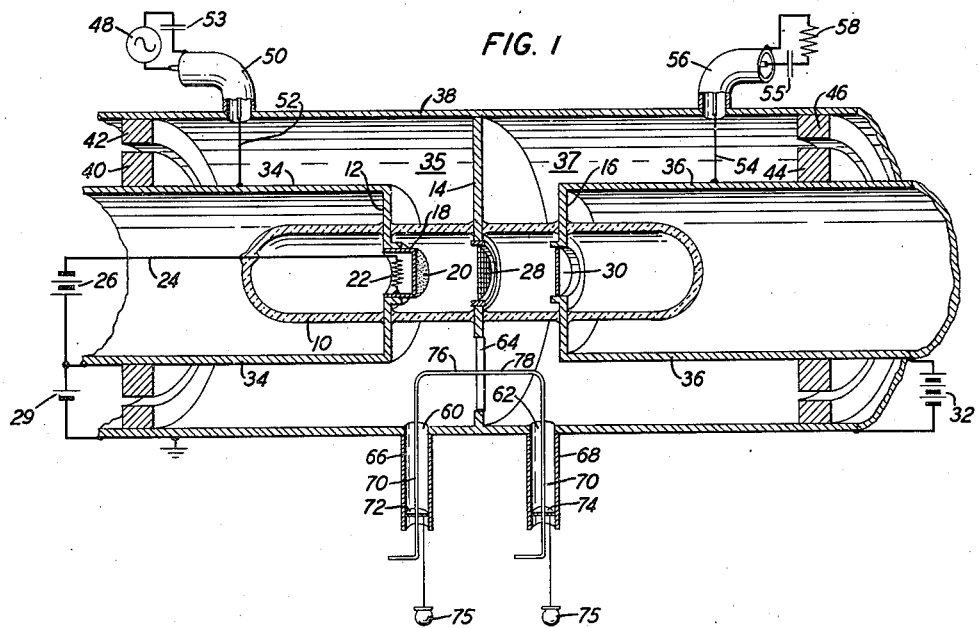
Fig. 1 is a broken perspective view of an ultra-high frequency triode of which both the input and the output tuning devices are cavity resonators and the novel coupling system provides a feedback path.

Referring now to the figures, Fig. 1 illustrates a single stage high frequency triode amplifier arrangement having tuned input and output cavity resonators. An evacuated envelope 10, for example of glass, provides a container and support for the electrodes within it. The electrodes and their supports and connections may be of any suitable type. For example, apertured discs 12, 14, 16 of metal or other conducting material may protrude through the envelope walls, being sealed thereto in airtight fashion. A short sleeve 18 may be fixed to the aperture of the first disc 12 extending somewhat forward thereof, being terminated in a flat surface 20 which is coated with a suitable thermionically emissive substance. A heater element 22 may be placed immediately behind the cathode surface 20 and within the sleeve 18, current being supplied thereto over a conductor 24 from a source 26, returning to the latter through the disc 12 and the input cavity wall.

A grid 28 may be centrally mounted in the aperture of the second disc 14. This grid may be a wire mesh of high electron transmissivity, as shown. Or, it may be an array of slats, or a relatively thick plate-like member pierced with a number of small holes in the direction of the electron flow from cathode to anode. Operating grid bias, positive or negative, may be provided by a battery 29 or other suitable source.

The anode 30 may be a simple plate, similarly mounted in the aperture of the third supporting disc 16. Potential may be supplied thereto as from a source 32 and over a part of the output resonator wall.

A cylindrical member 34 may be connected to the cathode disc 12 and extend rearwardly therefrom and another cylindrical member 36 may be connected to the anode disc 16 and extend forwardly therefrom. Coaxial with these cylindrical members there may be disposed a third cylindrical member 38 of greater diameter, connected to the periphery of the grid supporting disc 14. Rings 40, 42 connected to the members 34, 38, respectively, and insulated from each other, constitute a condenser which isolates the cathode 20 from the grid 28 for steady potentials but, being of large capacitance, offers a negligible impedance to currents of ultra-high frequencies at which a substantially closed input cavity resonator 35 is provided by the members 34, 38, the discs 12, 14, and the rings 40, 42. Similarly, a substantially closed output cavity resonator 37 is provided by the members 36, 38, the discs 14, 16, and rings 44, 46 which are insulated from each other and connected, respectively, to the cylindrical members 36, 38.

Input energy may be supplied to the input cavity resonator 35 in any desired manner, for example, from a source 48 over a coaxial line 50 and a tap 52, a blocking condenser 53 being provided in series with the tap to prevent short-circuiting of the condenser 40, 42. A like tap 54, in series with a blocking condenser 55, serves to abstract amplified energy from the output cavity resonator 37. It may then be supplied over a coaxial line 56 or otherwise, as desired, to a suitable load, symbolically indicated by a resistance element 58. The taps 52 and 54 may, if desired, be replaced by coupling loops in which case the condensers 53 and 55 are unnecessary.

Though not essential to the operation, sensitivity to stray influences is reduced by maintaining some selected part of the system at a definite potential. For example, the external cylinder 38 may be grounded.

It has heretofore been proposed to operate apparatus of the type described as a velocity variation device. In this event it has been necessary that the grid be maintained at a potential which is substantially positive with respect to the cathode. This mode of operation has certain advantages which are well known. It has at the same time the objection that it is accompanied by great amounts of undesired output signals known, by analogy with the low frequency art, as "noise." These noise signals are due principally to the fact that certain electrons actually bombard the metal of the grid and are captured by it, instead of passing through it to the plate, and are thereby lost to the electron stream. Efforts to avoid this difficulty by maintaining the grid at a potential which is substantially negative with respect to the cathode have resulted in instability and singing of a sort which is due to unwanted feedback from the output space to the input space, principally by way of the apertures in the grid.

The effects of these grid apertures on the operation of a thermionic tube are discussed in an article by F. B. Llewellyn published in the Bell System Technical Journal for October, 1935, at page 632 wherein there is shown at page 659 an equivalent network which is believed to be most accurately illustrative of the behavior of a triode having finite grid apertures.

Figure 11:
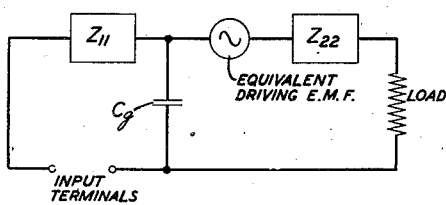
Fig. 11 is an equivalent circuit of a cavity resonator tuned triode.

When the input circuit of the triode is connected between cathode and grid and the output circuit between grid and anode as shown in Fig. 11, the capacitance element $C_g$ of the Llewellyn article is common to the input circuit and the output circuit. The impedance $Z_{11}$ is the impedance of the cathode-grid circuit and the impedance $Z_{22}$ is that of the grid-anode circuit, each reduced by $Z_g$, the mutual impedance of the common condenser $C_g$. This condenser constitutes a source of unavoidable feedback from the output circuit to the input circuit. Theoretically, this feedback may be neutralized by tuning the capacitance $C_g$ with a series connected inductance element. However, when the input and output circuits take the form of cavity resonators, this expedient becomes impossible and resort must be had to other neutralizing means.

Inasmuch as the invention provides means for coupling the output cavity resonator to the input cavity resonator with desired relations of phase and impedance values and thus in effect tuning the mutual capacitance $C_g$ of Fig. 11, it is well suited to carrying this neutralization of a cavity tuned discharge device into effect. It is especially useful in the ultra-high frequency range, for example at 3,000 megacycles or thereabouts, at which electrode spacings, tube dimensions and the like are so critical that it is well nigh impossible to effect the desired neutralization for a number of different tubes all made to the same specifications by fixed circuit elements. Final trimming adjustments must be made in the field. Consequently, a need has arisen for a simple, readily adjustable neutralizing means. On account of its readily adjustable nature the feed back system of the invention fills this need.

Returning now to Fig. 1, which illustrates a preferred embodiment of the invention, the outer cavity wall 38 is pierced by two small holes 60, 62 located on either side of the central grid supporting disc 14, and the latter is pierced by a radial slot 64 located near the line joining these two holes.

One end of a tubular conductor 66, 68 is connected to the cavity wall surrounding each of these holes 60, 62, and each of these conductors extends away from its associated hole for some distance. A single inner conductor 70 extends through the tubular conductor 66 and the hole 60 into the input cavity 35, turns, passes through the slot 64 in the grid supporting plate 14 into the output cavity 37, turns again, and passes out through the hole 62 and the tubular conductor 68 to the outside. The outwardly extending part of this inner conductor is conductively connected to each of the tubular conductors containing it by way of short-circuiting discs 72, 74 to each of which is attached a handle 75, for example, of plastic material by means of which its position may be manually adjusted.

The portions 76, 78 of the inner conductor 70 are evidently disposed to link a part of the magnetic flux which oscillates within the cavities 35, 37 when the system is in operation.

Figure 3:
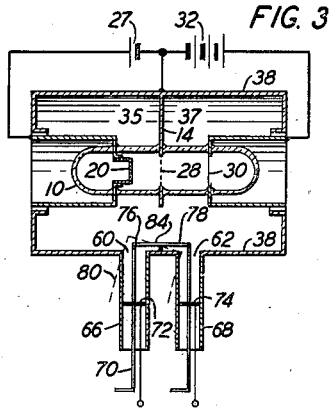
Fig. 3 is a simplified circuit diagram of Fig. 1.
Figure 4:
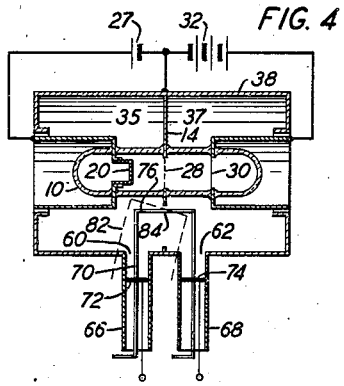
Fig. 4 is a diagram similar to Fig. 3 but in which the couplings to both resonators have been altered in like amounts.
Figure 5:
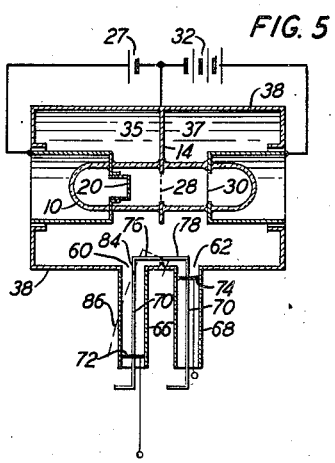
Fig. 5 is a diagram similar to Fig. 3 but in which the couplings to the resonators have been altered in unlike amounts.
Figure 6:
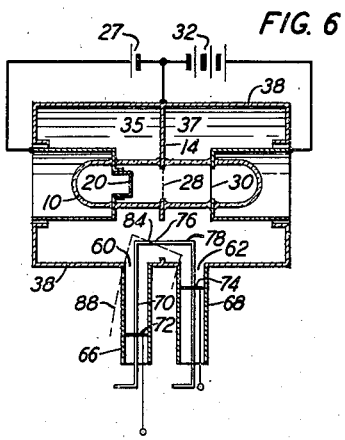
Fig. 6 is a diagram similar to Fig. 3 but in which the couplings to the resonators have again been altered in unlike amounts, but to a less extent than in Fig. 5.

Referring to Figs. 3 and 4, which are simplified schematic equivalents of Fig. 1, it is clear that the amount of flux linked by the portions 76, 78 of the conductor 70 is increased by extending the inner conductor radially inward toward the grid 28, thus increasing the coupling, and reduced by withdrawing it radially outward toward the cavity wall 38. It is shown withdrawn in Fig. 3 for loose coupling and extended in Fig. 4 for tight coupling. In both cases the short-circuiting discs 72, 74 are placed at equal distances from the cavity wall 38 and, therefore, from the grid supporting disc 14. Inasmuch as the inner conductor 70 is firmly connected to the outer ones at these points, the two outer conductors 66, 68 with the inner one 70, including the flux linking portions 76, 78, amount to a transmission line which is short-circuited at both ends. When the full length of such line is adjusted approximately to a half wave-length at the operating frequency, the ends become current antinodes and the mid-point a current node. If the line is slightly less than a half wave in length, it presents a large inductive reactance to currents flowing therein. If its length is slightly in excess of a half wave, it presents a large capacitive reactance. These approximate half-wave conditions are illustrated in the figures by the broken lines 80, 82, 86, 88, which, in a qualitative sense, are plots of the current amplitudes for various line adjustments, as functions of distance along the line, measured from the bent inner conductor 70 as an axis. When the two line portions are of equal length the current node 84 appears in the plane of the grid supporting plate, the current in the portion 76 being in opposite phase to that in the portion 78. On the other hand, if by movement of the short-circuiting discs 72, 74 one part of the line be so shortened and the other part be so lengthened that, as illustrated in Fig. 5, the node 84 appears in one of the coaxial portions, the currents 86 in the flux linking portions 76, 78 are in phase. An intermediate condition exists when the node 84 is within one of the cavity resonators at a point somewhat removed from the grid supporting disc 14. This condition, illustrated in Fig. 6, shows that the current 88 in the loop 78 is in phase with that in a part of the loop 76 while that in the remaining part of the loop 76 is in opposite phase. Which of these various conditions will best serve for neutralization of unwanted feedback, or for regeneration or degeneration at the signal frequency, depends in a highly complex fashion on a number of factors, chief among which are the magnitude and phase of the unwanted feedback to be neutralized, and the relative magnitudes and phases of the electromagnetic fields in the input and output tuning cavity resonators. On account of the ease with which the adjustments may be made, the optimum arrangement is best found experimentally for each particular tube and for each set of operating potentials and frequency. Thus, for example, the optimum adjustments for neutralization may readily be found by supplying energy to the output resonator 37 over the line 56 (Fig. 1), withdrawing attenuated energy from the input resonator 35 over the line 50 and altering the line length and coupling loop areas of the novel feedback system until the energy withdrawn from the input resonator 35 is a minimum. A suitable modified sequence of operations will suggest themselves to those skilled in the art for discovering the optimum adjustments for regenerative or degenerative feedback.

It is to be noted that the novel system provides a wide variation in the phase of the energy fed back from one cavity to the other. When the electrical length of the full line from one of the short-circuiting discs 72, 74 to the other is exactly a half wave-length its impedance is purely resistive. When it is slightly less, it presents an inductive reactance and when slightly greater, a capacitive reactance. As its length is varied, its reactance varies from a high positive value through zero to a high negative value. For each value of reactance there is a corresponding value of resistance, and, therefore, of the phase angle of the effective impedance of the line.

Figure 10:
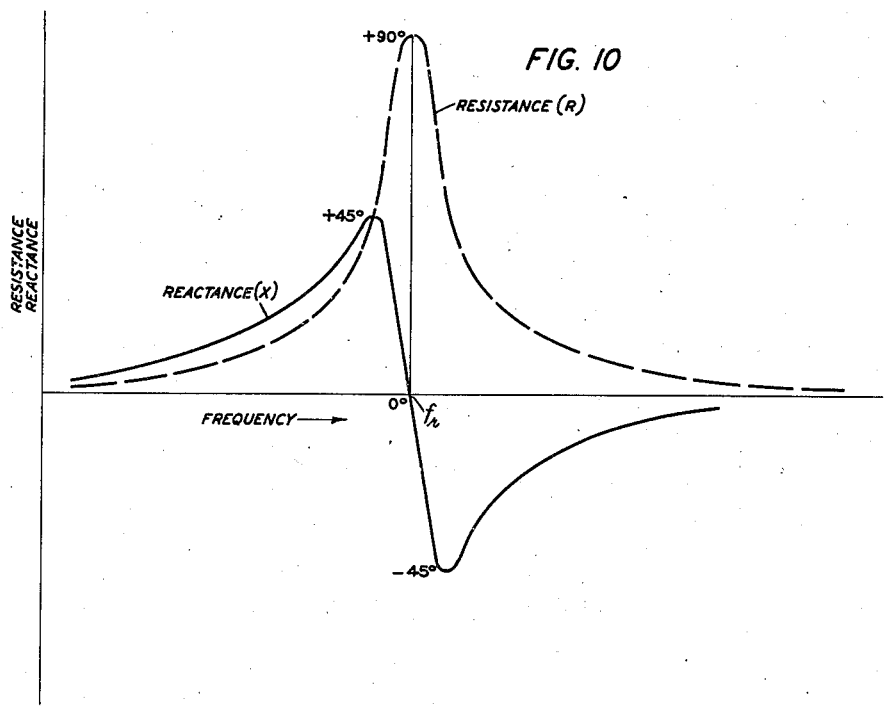
Fig. 10 is a plot of impedance characteristics illustrating the effect of variations in the length of the novel feedback system under certain conditions of adjustment.

These effects are similar to those which are present when the tuning of a resonant circuit of lumped circuit elements is varied through the resonant frequency from a lower value to a higher one. The familiar resistance and reactance characteristics of an antiresonant circuit are shown in Fig. 10 as functions of frequency on either side of the resonant frequency $f_r$. The effective phase angles of the impedance are marked in degrees on the reactance curve X for certain frequency values.

Now a transmission line whose full electrical length is of the order of a quarter wave-length at the frequency of operation behaves in many ways like an antiresonant circuit of lumped constants, and when the electrical length of the full line in the novel coupling circuit is adjusted to a half wave-length or thereabouts, it is in effect a pair of such quarterwave lines connected in series with the driving elements, i. e., the loops 76, 78, between them. Therefore, when so adjusted its performance may be represented by the curves of Fig. 10, wherefrom it is evident that the novel arrangement provides means for readily effecting a wide variation in the phase of the feedback energy. Such variation is useful because it permits unwanted feedback of widely different phase angles to be neutralized, and also permits affirmative feedback, positive or negative, to be secured without interference from the particular value of the phase angle of the transadmittance of the device.

Though discussed and explained in connection with an illustrative embodiment in which the electrical length of the full line is of the order of a half wave-length, the coupling system of the invention may, of course, be adjusted in various other ways to meet specific needs, as the requirements of particular coupling problems may dictate.

Figure 2:
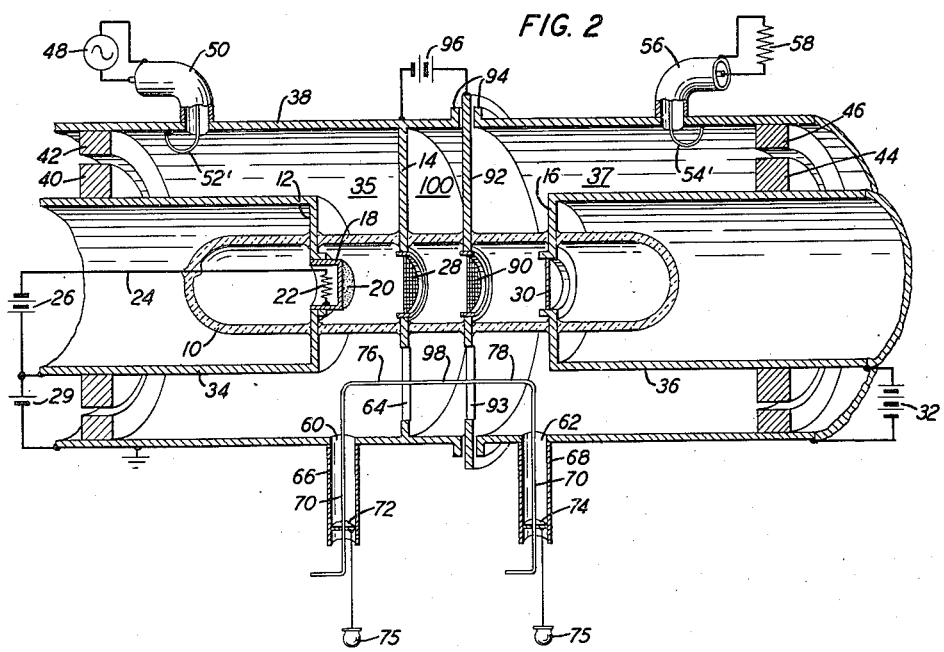
Fig. 2 shows the system of Fig. 1 as modified for use with a tetrode.

Fig. 2 shows a modification of the invention as applied to a four-electrode tube. Except for the lack of a wall which is common to the input and output resonators, the vessel, cathode, control electrode, anode, and input and output cavity resonators may be similar to those of Fig. 1 and are identified by like reference numerals. A signal may be supplied to the input resonator by way of a loop 52', and withdrawn from the output resonator by way of another loop 54'. Taps may be substituted, as in Fig. 1, if desired.

Between the control electrode 28 and the anode 30 a fourth "screen" electrode 90 is mounted in the aperture of a screen supporting disc 92 which extends through the envelope wall and is sealed thereto, and may extend beyond the same to and through the cavity wall 38 where it passes between flanges 94 which are insulated therefrom and constitute with the disc 92 a by-pass condenser which permits a desired operating potential to be applied to the screen 90, as by a source 96 but offers a negligible impedance to currents of signal frequencies. The novel feedback system may again be the same as that of Fig. 1 except for the fact that a small length 98 of the inner conductor, between coupling loops 76, 78, lies in the space 100 between the input resonator 35 and the output resonator 37, passing through a radial slot 93 in the disc 92. This space 100 is virtually field-free, inasmuch as it is shielded by the walls 38, 14, 92. It will, in general, be short compared to the operating wavelength, so that the effect of the portion 98 of the feedback conductor 70 in modifying the behavior of the system may be neglected. However, if desired, its length may be substantial as compared with this wave-length, compensatory adjustments being made in the dispositions of the short-circuiting discs 72, 74. Variations in the line length, the loop sizes and the position of the current node 84 may be made in the manner shown in Figs. 3, 4, 5, and 6.

Figure 7:
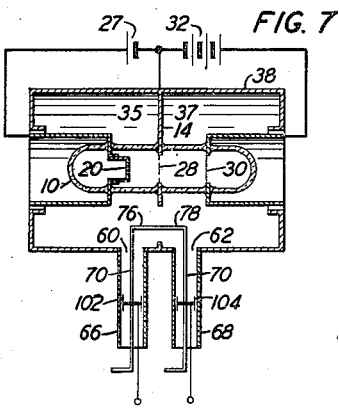
Fig. 7 is a modification of Fig. 3 in which the tuning lines are terminated in capacitances.

It will be apparent that certain of the principles underlying the invention may be put into practice and corresponding advantages secured by the use of lines terminated in impedances of various characteristics other than short-circuited lines. For example, the short-circuiting discs 72, 74 may be replaced by discs 102, 104 surrounded by annular bands of insulating material as indicated in Fig. 7, thus providing capacitive terminations. Similarly, if adequate shielding be provided, open-circuited lines may be employed. Indeed, the coupling loops of the invention may be terminated and tuned in any desired manner, for example by a Lecher pair, of which the conductors forming the pair emerge from the resonant cavities and are surrounded by a shield common to both, suitable tuning means being provided.

Figure 8:
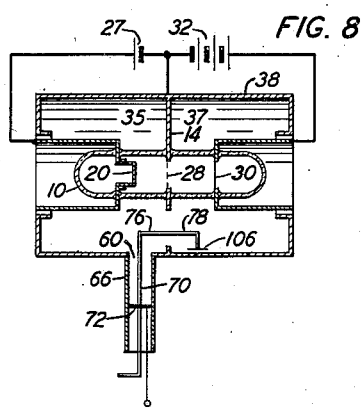
Fig. 8 shows a modification of Fig. 3 in which only one coaxial line branch is employed.

Again, for some purposes a single coaxial line extension may provide all the freedom of adjustment which may be necessary. Such an arrangement is shown schematically in Fig. 8 for a triode. It may be adapted to a tetrode in the manner shown in Fig. 2. The inner conductor 70, instead of passing out through the cavity wall at two points to become the inner conductor of both branches of a coaxial line, passes out at one point 60 to become the inner conductor of one such branch but is directly coupled to the wall of the other cavity as by way of a condenser 106. This coupling may, if desired, be a direct conductive connection. The structures to which these figures correspond may be similar to those of Figs. 1 and 2, respectively, except for the omission of one branch 68 of the tuning line. The coaxial line branch shown may be associated with either one of the cavities as desired, the inner conductor being coupled to the wall of the other.

Figure 9:
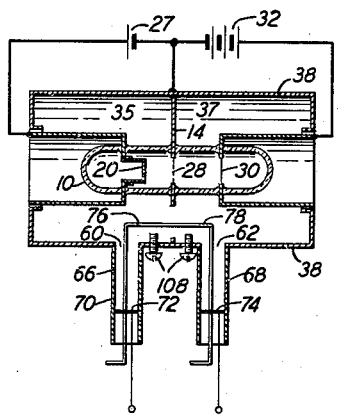
Fig. 9 shows a modification of Fig. 3 employing tuning means internal to the cavity resonators.

In still another modification illustrated in Fig. 9, the tuning means, while available externally of the cavity resonators for manipulation, function principally within the cavities themselves. For example, adjustment of the tuning may be effected by variation of the capacitive couplings of the loops 76, 78 to the cavity walls, as by adjusting screws 108 which pass through threaded holes in the cavity walls, either or both of which may be approached toward the loops 76, 78, respectively, more or less, as desired. In such case the external line extensions 66, 68, 70 may be dispensed with altogether, reliance being placed entirely on the screws 108 for tuning. Though fixed coupling loops 76, 78 may be employed, if desired, means for varying the coupling to the respective cavities in some such fashion as that shown are preferred.

Variants and combinations of these modifications which are within the spirit of the invention will suggest themselves to those skilled in the art.

Although described by way of illustration as applied to a cavity tuned discharge device with negative grid, the invention is by no means limited to this specific application, but is useful wherever a readily adjustable coupling between two cavity resonators is required.

What is claimed is:

1. In combination with a high frequency discharge device having a cathode, a control electrode and an anode, an input cavity resonator coupled to the cathode and the control electrode and an output cavity resonator coupled to the control electrode and the anode, said two resonators having a wall in common, means for coupling back said output resonator to said input resonator which comprises a conductor extending through said common wall, through a portion of the cavity defined by each of said resonators, and emerging through an outer boundary wall of each of said resonators to the region outside the same and extending away from the point of emergence, tubular conductors connected to said outer boundary wall, each surrounding one of said outwardly extending parts and forming therewith a coaxial line branch, and an adjustable short-circuiting disc connecting each of said tubular conductors to the conductor portion within it, said first-named conductor being insulated from all of said walls in the regions where it passes therethrough.

2. In combination with an electromagnetic oscillation device including a pair of cavity resonators in each of which there exist electromagnetic fields when the device is in operation, said resonators having an apertured wall in common, means for intercoupling said resonators which comprises a conductor extending through the aperture of said common wall, linking a portion of the electromagnetic field of each of said resonators, and being coupled to a wall of each of said resonators at a point removed from said aperture, and means for tuning said conductor to a frequency bearing a desired relation to the frequency of oscillation of said device.

3. In combination with an electromagnetic oscillation device including a pair of cavity resonators in each of which there exist electromagnetic fields when the device is in operation, a wall of each of said resonators having an aperture colinearly juxtaposed with a corresponding aperture in the other of said resonators, means for intercoupling said resonators which comprises a conductor extending through said juxtaposed apertures, linking a portion of the electromagnetic field of each of said resonators, and being coupled to a wall of each of said resonators at a point removed from said aperture, and means for tuning said conductor to a frequency bearing a desired relation to the frequency of oscillation of said device.

4. In combination with a high frequency discharge device having a cathode, a control electrode and an anode, an input cavity resonator coupled to the cathode and the control electrode and an output cavity resonator coupled to the control electrode and the anode, said two resonators having a wall in common, means for coupling back said output resonator to said input resonator which comprises a conductor extending through said common wall, through a portion of the cavity defined by each of said resonators, and emerging through an outer boundary wall of each of said resonators where it becomes the inner conductor of a coaxial line branch, tubular conductors each connected to said boundary wall about a point of emergence of said inner conductor therethrough and constituting the outer conductor of one of said coaxial line branches, said first-named conductor being insulated from each of said walls, and means for adjusting the electrical length of each of said coaxial line branches in desired proportion to the wavelength at which said discharge device is intended to operate.

5. In combination with a high frequency discharge device having a cathode, a control electrode, a screen electrode and an anode, an input cavity resonator coupled to the cathode and the control electrode and an output cavity resonator coupled to the screen electrode and the anode, means for coupling back said output resonator to said input resonator which comprises a conductor extending into said input resonator through a part of the wall thereof, through a portion of the cavity defined by said resonator, out of said resonator through another part of the wall thereof, into said output resonator through a part of the wall thereof, through a portion of the cavity defined by said output resonator and emerging out of said output resonator through another part of the wall thereof to the region outside of the same and extending away from the point of emergence to become the inner conductor of a coaxial line branch, tubular conductors connected to said resonator walls, each surrounding one of said outwardly extending portions of said first-named conductor and constituting the outer conductors of said coaxial line branches, said first-named conductor being insulated from each of said walls, and means for adjusting each of said coaxial line branches to a desired electrical length.

6. In combination with a high frequency discharge device having a cathode, a control electrode and an anode, an input cavity resonator coupled to the cathode and the control electrode and an output cavity resonator coupled to the control electrode and the anode, said two resonators having a wall in common, means for coupling back said output resonator to said input resonator which comprises a conductor extending through said common wall, through a portion of the cavity defined by each of said resonators, and emerging through an outer boundary wall of each of said resonators where it becomes the inner conductor of a coaxial line branch, tubular conductors each connected to said boundary wall about a point of emergence of said inner conductor therethrough and constituting the outer conductor of one of said coaxial line branches, said first-named conductor being insulated from each of said walls, and means for adjusting the electrical length of the coaxial line formed by said line branches and the portions of said inner conductor lying within said cavities in desired proportion to the wave-length at which the said discharge device is intended to operate.

7. In combination with a high frequency discharge device having a cathode, a control electrode and an anode, an input cavity resonator coupled to the cathode and the control electrode and an output cavity resonator coupled to the control electrode and the anode, said two resonators having a wall in common, means for coupling back said output resonator to said input resonator which comprises a conductor coupled to the inside wall of one of said resonators and extending through a portion of the cavity defined by each of said resonators, through said common wall and emerging through an outer boundary wall of the other of said resonators to the region outside the same and extending away from the point of emergence, a tubular conductor connected to said outer boundary wall surrounding said outwardly extending conductor portion and forming therewith a coaxial line branch, and an adjustable short-circuiting disc connecting said tubular conductor to the conductor portion within it, said first-named conductor being insulated from walls through which it passes.

8. In combination with a high frequency discharge device having a cathode, a control electrode and an anode, an input cavity resonator coupled to the cathode and the control electrode and an output cavity resonator coupled to the anode and another electrode, means for coupling back said output resonator to said input resonator which comprises a conductor extending through a portion of the cavity defined by each of said resonators to form there a loop in position to link a portion of the magnetic flux oscillating within each of said cavities and emerging through an outer boundary wall of each of said resonators to the region outside the same and extending away from the point of emergence, tubular conductors connected to said outer boundary wall, each surrounding one of said outwardly extending portions and forming therewith a coaxial line branch, an adjustable short-circuit disc connecting each of said tubular conductors to the conductor portion within it, said first-named conductor being insulated from all of said walls in the regions where it passes therethrough, and means for varying at will the areas of said loops.

9. In combination with a high frequency discharge device having a cathode, a control electrode and an anode, an input cavity resonator coupled to the cathode and the control electrode and an output cavity resonator coupled to the anode and another electrode, means for coupling back said output resonator to said input resonator which comprises a conductor extending through a portion of the cavity defined by each of said resonators to form there a loop in position to link a portion of the magnetic flux oscillating within each of said cavities and emerging through an outer boundary wall of each of said resonators where it becomes the inner conductor of a coaxial line branch, tubular conductors each connected to said boundary wall about a point of emergence of said inner conductor therethrough and constituting the outer conductors of said coaxial line branches, said first-named conductor being insulated from each of said walls, means for adjusting the electrical length of each of said coaxial lines in desired proportion to the wavelength of said discharge device, and means for adjusting at will the areas of said loops.

10. In combination with a plurality of cavity resonators, means for intercoupling two of said resonators which comprises a conductor extending into one of said resonators through a part of the wall thereof, through a portion of the cavity defined by said resonator, out of said resonator through another part of the wall thereof, into the other of said resonators through a part of the wall thereof, through a portion of the cavity defined by said other resonator and emerging out of said other resonator through another part of the wall thereof to the region outside of the same and extending away from the point of emergence to become the inner conductor of a coaxial line branch, tubular conductors connected to said resonator walls, each surrounding one of said outwardly extending portions of said first-named conductor and constituting the outer conductors of said coaxial line branches, said first-named conductor being insulated from each of said walls, and means for adjusting each of said coaxial line branches to a desired electrical length.

ROBERT M. RYDER.

REFERENCES CITED

The following references are of record in the file of this patent:

UNITED STATES PATENTS

| Number | Name | Date |
|---|---|---|
| 1,637,977 | Williams | Aug. 2, 1927 |
| 1,848,912 | Taylor | Mar. 8, 1932 |
| 2,278,210 | Morton | Mar. 31, 1942 |